United States Patent
Svanholm (10) Patent No.: US 8,345,928 B2
(45) Date of Patent: Jan. 1, 2013

(54) LOCALIZING A SURVEYING INSTRUMENT IN RELATION TO A GROUND MARK

(75) Inventor: Set Svanholm, Sollentuna (SE)

(73) Assignee: Trimble AB, Danderyd (SE)

( * ) Notice: Subject to any disclaimer, the term of this patent is extended or adjusted under 35 U.S.C. 154(b) by 270 days.

(21) Appl. No.: 12/735,256

(22) PCT Filed: Jun. 26, 2008

(86) PCT No.: PCT/EP2008/058183
§ 371 (c)(1),
(2), (4) Date: Aug. 10, 2010

(87) PCT Pub. No.: WO2009/100774
PCT Pub. Date: Aug. 20, 2009

(65) Prior Publication Data
US 2010/0303300 A1   Dec. 2, 2010

(30) Foreign Application Priority Data

Feb. 12, 2008   (WO) ................. PCT/EP2008/001053
Feb. 29, 2008   (WO) ................. PCT/EP2008/052531

(51) Int. Cl.
*G06K 9/00* (2006.01)
(52) U.S. Cl. ........................................................ 382/106
(58) Field of Classification Search .................. 356/3–7; 33/281–290; 382/100–107
See application file for complete search history.

(56) References Cited

U.S. PATENT DOCUMENTS

| | | | |
|---|---|---|---|
| 5,949,548 A | 9/1999 | Shirai | |
| 6,384,902 B1 | 5/2002 | Schneider | |
| 6,411,372 B1 | 6/2002 | Donath | |
| 6,453,569 B1 | 9/2002 | Kumagai | |
| 6,559,931 B2 | 5/2003 | Kawamura | |
| 6,688,010 B1 | 2/2004 | Schwaerzler | |
| 7,503,123 B2 | 3/2009 | Matsuo et al. | |
| 2003/0048438 A1 | 3/2003 | Kawamura et al. | |

(Continued)

FOREIGN PATENT DOCUMENTS

CN   101101210   1/2007

(Continued)

OTHER PUBLICATIONS

Chinese Office Action dated Mar. 12, 2012 issued in corresponding Chinese Application No. 200880125829.7 and English translation thereof.

(Continued)

*Primary Examiner* — Atiba O Fitzpatrick
(74) *Attorney, Agent, or Firm* — Harness, Dickey & Pierce, P.L.C.

(57) ABSTRACT

A method is disclosed for localizing, in relation to a mark located at a ground level, a surveying instrument having a housing including at least one camera. In at least one embodiment, the method includes aligning the vertical rotational axis of the surveying instrument with the mark using a pointing device; capturing an image of the ground below the housing with the camera arranged in a known camera position and orientation, wherein the camera position is eccentric to the rotation center of the surveying instrument; identifying an object point corresponding to the mark in the captured image; measuring image coordinates of the object point in the captured image; and determining the height of the rotation center of said instrument above the ground based on the image coordinates and camera calibration data. Furthermore, a surveying instrument for performing at least one embodiment of the method is disclosed.

20 Claims, 4 Drawing Sheets

U.S. PATENT DOCUMENTS

| | | |
|---|---|---|
| 2004/0131248 A1 | 7/2004 | Ito et al. |
| 2005/0057745 A1 | 3/2005 | Bontje |
| 2006/0017938 A1 | 1/2006 | Ohtomo et al. |
| 2006/0021236 A1 | 2/2006 | Endo |
| 2006/0167648 A1 | 7/2006 | Ohtani |
| 2007/0065004 A1 | 3/2007 | Kochi et al. |
| 2007/0104353 A1 | 5/2007 | Vogel |
| 2008/0120855 A1 | 5/2008 | Matsuo et al. |
| 2008/1202855 | 5/2008 | Matsuo et al. |

FOREIGN PATENT DOCUMENTS

| | | |
|---|---|---|
| DE | 144967 | 11/1980 |
| DE | 10 2007030784 | 1/2008 |
| EP | 0971207 | 1/2000 |
| EP | 0 997 704 | 5/2000 |
| EP | 1 139 062 | 10/2001 |
| EP | 1 607 718 | 12/2005 |
| EP | 1 655 573 | 5/2006 |
| JP | 4-198809 | 7/1992 |
| JP | 2000-131060 | 5/2000 |
| JP | 2005-017262 | 1/2005 |
| JP | 2007-147422 | 6/2007 |
| WO | WO 2004/057269 | 7/2004 |
| WO | WO 2005/059473 | 6/2005 |
| WO | WO 2009/100728 | 8/2009 |
| WO | WO 2009/100773 | 8/2009 |
| WO | WO 2009/106141 | 9/2009 |

OTHER PUBLICATIONS

International Preliminary Report on Patentability and Written Opinion dated Apr. 15, 2010 issued in related application No. PCT/EP2008/052531.

International Search Report dated Dec. 9, 2008 in related application No. PCT/EP2008/052531.

International Search Report dated Nov. 13, 2008 in related application No. PCT/EP2008/001053.

International Search Report dated Nov. 6, 2008 in related application No. PCT/EP2008/058175.

Zhang et al.: "Photo Total Station System an Integration of Metric Digital Camera and Total Station" Conference on Optical 3-D Measurement Techniques (vol. I, pp. 176-182) Sep. 22, 2003.

LOCALIZING A SURVEYING INSTRUMENT IN RELATION TO A GROUND MARK

TECHNICAL FIELD

The present invention relates to a method for localizing a surveying instrument, such as a total station, in a coordinate system, for instance a ground-based coordinate system. In particular, the present invention relates to a method for determining the height of a surveying instrument having a housing including at least one camera above a mark located at the ground level and a method for localizing the surveying instrument in relation to the mark.

BACKGROUND

The art of surveying involves the determination of unknown positions, surfaces or volumes of objects using measurements of angles and distances. In order to make these measurements, a surveying instrument frequently comprises an electronic distance measurement unit (EDM unit) which may be integrated in a theodolite, thereby forming a so-called total station. A total station combines electronic, optical and computer techniques and is furthermore provided with a computer or control unit with writable information for controlling the measurements to be performed and for storing data obtained during the measurements. A typical total station comprises a base with tribrach mounted on a tripod, an alidade mounted on the base for rotation about a vertical axis and a center unit mounted on the alidade for rotation about a horizontal axis. The center unit of the total station comprises a telescope and optical elements for aiming at a target. In particular, the center unit is provided with an EDM unit which operates generally in the direction of the optical axis of the center unit, i.e. along the line of sight. In, for example, WO 2004/057269 by the same applicant, such a total station is described in more detail. Preferably, the total station calculates the position of a target in a coordinate system, e.g. a fixed ground-based coordinate system. However, as the total station measures the position of the target relative to its own position, the position (or location) of the total station in the fixed ground-based coordinate system needs to be known.

According to a first alternative, the position of the total station in a fixed ground-based coordinate system may be determined by a method called "free stationing". In this method, the surveying instrument is placed at an arbitrarily chosen location in the coordinate system (e.g. at a worksite). First, a leveling procedure is performed such that the total station is not tilted when mounted on the tripod. In particular, it is determined whether the vertical rotational axis (nadir) of the total station is aligned with a vertically plumbed axis, i.e. the nadir of the instrument extends vertically. Then, the directions, i.e. the vertical and horizontal angles, and optionally the distances to two (or more) targets placed at two (or more) known points of the ground-based coordinate system are measured. These known points may also be called control points. The control points of the ground-based coordinate system correspond to reference points or reference marks located at the ground level, and the coordinates of these control points in the ground-based coordinate system are known. Once the directions to these two (or more) control points are obtained, the location of the total station, i.e. the location coordinates of the total station, in the ground-based coordinate system can be determined.

According to another alternative, the total station may be directly positioned above a control point of the ground-based coordinate system. First, the tripod is approximately set over the control point and roughly leveled. The total station is then mounted on the tripod and centered above the control point by looking through the eye piece of an optical plummet. The eye piece provides a view with a center mark that allows centering of the total station directly over the control point. The final centering is performed according to an iterative procedure during which a surveyor slides the total station over the tripod (e.g. by moving the tribrach) until the total station is centered over the control point, i.e. with the center mark seen in the eye piece over the control point. Once the total station is centered and leveled, the total station is firmly attached to the tripod. At this stage, the coordinates (x, y) of the total station in the ground-based coordinate system are known and correspond to the coordinates of the control point. However, a complete localization of the total station requires also a determination of the height at which the total station is located and an orientation of the direction at which the total station is pointing. The height is normally determined using a measuring tape or a similar device; however, the accuracy of such a measurement is usually limited, thereby decreasing the accuracy of the measurements later made by the surveying instrument. The orientation of the total station is achieved by pointing the center unit of the surveying instrument at another control point (having a known position) located at a remote distance from the total station and determining the horizontal angle of the total station to this control point.

In summary, the prior art methods described above are of limited accuracy, time consuming and not user friendly.

Thus, there is a need for providing new methods and systems that would overcome these problems.

SUMMARY

An object of the present invention is to wholly or partly overcome the above disadvantages and drawbacks of the prior art and to provide a more efficient alternative to the above techniques and prior art.

More specifically, it is an object of the present invention to provide a method for localizing a geodetic (or surveying) instrument in relation to a mark located at a ground level (also called ground mark or mark in the following) under the instrument and a geodetic instrument thereof.

A particular object of the present invention is to provide a method and surveying instrument for facilitating the measurement of the height of the instrument above the ground and in particular the height above the mark located at the ground level.

Another object of the present invention is to provide a method and surveying instrument facilitating the localization of the surveying instrument in relation to the mark located at the ground level, i.e. the determination of the relative three-dimensional coordinates of a rotation center of the surveying instrument in relation to the ground mark.

Another object of the present invention is to provide a method and surveying instrument for increasing the accuracy in localization of the surveying instrument in a coordinate system. The coordinate system may be a ground-based coordinate system or a coordinate system where reference points are determined by GPS.

These and other objects of the present invention are achieved by means of a method, a surveying instrument and a computer program product having the features defined in the independent claims. Preferable embodiments of the invention are characterized by the dependent claims.

Throughout the application, the terms "geodetic instrument", "surveying instrument" and "total station" will be used interchangeably. Further, the terms "position" and "location" will also be used interchangeably.

Hence, according to a first aspect of the present invention, a method for localizing a geodetic instrument having a housing including at least one camera is provided. The method comprises the steps of aligning the vertical rotational axis of the surveying instrument with a mark located at a ground level using a pointing device, capturing an image of the ground below the housing with the camera arranged in a known camera position and orientation, wherein the camera position is eccentric to the rotation center of the surveying instrument, identifying an object point corresponding to the mark in the captured image, measuring image coordinates of the object point in the captured image, and determining the height of the rotation center of the instrument above the ground based on the image coordinates and camera calibration data.

According to a second aspect of the present invention, a geodetic instrument is provided. The geodetic instrument comprises a pointing device adapted to align the vertical rotational axis of the instrument with a mark located at a ground level and at least one camera adapted to capture an image of the ground below the instrument. The camera is arranged in a known camera orientation and position, and the camera position is eccentric to a rotation center of the surveying instrument. The geodetic instrument further comprises an identifying unit adapted to identify an object point corresponding to the mark in the captured image, a measuring unit adapted to measure image coordinates of the object point in the captured image and a processor adapted to determine the height of the rotation center of the surveying instrument above the ground based on the image coordinates and camera calibration data.

According to a third aspect of the present invention, there is provided a computer program product comprising computer program code portions adapted to perform the method in accordance with the first aspect of the present invention when loaded and executed in a computer.

The present invention makes use of an understanding that, after aligning the nadir (or vertical rotational axis) of a surveying instrument or total station with a mark located at a ground level, the height of the surveying instrument can be determined by means of a camera arranged in a position eccentric to a rotation center of the instrument. The present invention is based on the use of trigonometry or triangulation to obtain the height of the instrument above the ground.

Using the eccentricity of a camera, the present invention makes use of an understanding that the height can be determined, in an image captured by the camera, from the image coordinates of an object point corresponding to the mark.

The position of the camera, i.e. the distance between the rotation center of the instrument and the camera, and the angular orientation of the camera, i.e. the angle formed between the image sensor of the camera (or alternatively the camera axis of the camera) and the line intersecting the rotation center of the instrument and the center of the image sensor of the camera, are calibrated (known) after assembly of the instrument. The calibration data of the camera may therefore be defined as a position and an angular orientation. However, the camera calibration data is not necessarily limited to these parameters and may comprise other parameters. For example, the angular orientation of the camera may be defined in terms of several angles related to the various rotational axis of the instrument. Such camera calibration data can be stored in the instrument.

The present invention is advantageous in that it provides an accurate and easy-to-implement method for determining the height and/or the coordinates of a total station in relation to a ground reference point.

According to an embodiment, the pointing device is an optical plummet calibrated in relation to the vertical rotational axis of the instrument. The optical plummet includes an eye piece for providing a view with a center mark that allows centering of the total station over the mark located at the ground level by mechanically moving the total station, thereby aligning the vertical rotational axis of the instrument with the mark.

According to another embodiment, the pointing device is a laser plummet including a laser pointer calibrated in relation to the vertical rotational axis of the instrument. The laser plummet provides a point or pattern visible on the ground that allows centering of the total station over the mark located at the ground level by mechanically moving the total station, thereby aligning the vertical rotation axis of the instrument with the mark.

According to an embodiment, the at least one camera is arranged in a position eccentric with respect to the nadir of the total station by means of a mechanical arrangement for folding out the camera from the instrument housing such that the field of view of the camera covers the area below the instrument. The optical characteristics of the at least one camera and the camera position and orientation are selected such that the area between the legs of the tripod (at the ground level) can be viewed in the images captured by the camera.

Arrangement of the at least one camera far from the nadir of the instrument is beneficial since a broad view of the area between the legs of the tripod is provided. The at least one camera is preferably arranged such that the captured image provides a view of the ground as seen from the outside of the area defined by the legs of the tripod on which the instrument is mounted. In such a configuration, the object points corresponding to the legs of the tripod in the captured images define the area in which the object point corresponding to the ground mark is located.

Although the method of the present invention is defined using one camera in a single position and orientation, it will be understood that more than two images may be used to determine the height of the total station above the ground mark, thereby increasing accuracy in the determination of the height and/or the relative three-dimensional coordinates of the instrument. In particular, the instrument may be rotated around its rotational center from a first position to a second position, the rotation center being maintained fixed, in order to capture a first image in a first camera position and a second image in a second camera position. Alternatively, the instrument may comprise two cameras of which a first camera is arranged in a first camera position and orientation and a second camera is arranged in a second camera position and orientation.

According to an embodiment, the method of the present invention comprises the step of determining the relative three-dimensional coordinates of the rotation center of the instrument in relation to the mark based on the image coordinates of the object point corresponding to the ground mark identified in the captured image and camera calibration data. In this context, it is noted that since the nadir of the instrument is aligned with the ground mark, the two-dimensional coordinates of the rotation center of the instrument and the ground mark are the same or nearly the same.

The method of the present invention may be implemented when setting up the total station over a known reference point, i.e. with the location of the mark located at the ground level known in a coordinate system. The method of the present invention is used to determine the location of the total station in the coordinate system based on the relative coordinates of the total station in relation to the known ground mark. In particular, the two-dimensional coordinates of the rotation center of the instrument, in a horizontal place, are equivalent to the coordinates of the ground mark since the nadir of the total station is aligned with the ground mark in accordance with the present invention.

The present invention also provides a total station which comprises various means for carrying out the above-described method.

In addition, the present invention can be implemented in a computer program that, when executed, performs the inventive method in a surveying instrument. The computer program may, for example, be downloaded into a surveying instrument as an upgrade. As will be understood, the inventive method can be implemented for a surveying instrument using software, hardware or firmware, or a combination thereof, as desired in view of the particular circumstances.

BRIEF DESCRIPTION OF THE DRAWINGS

In the following detailed description, reference is made to the accompanying drawings, on which.

DETAILED DESCRIPTION

Figure 1:
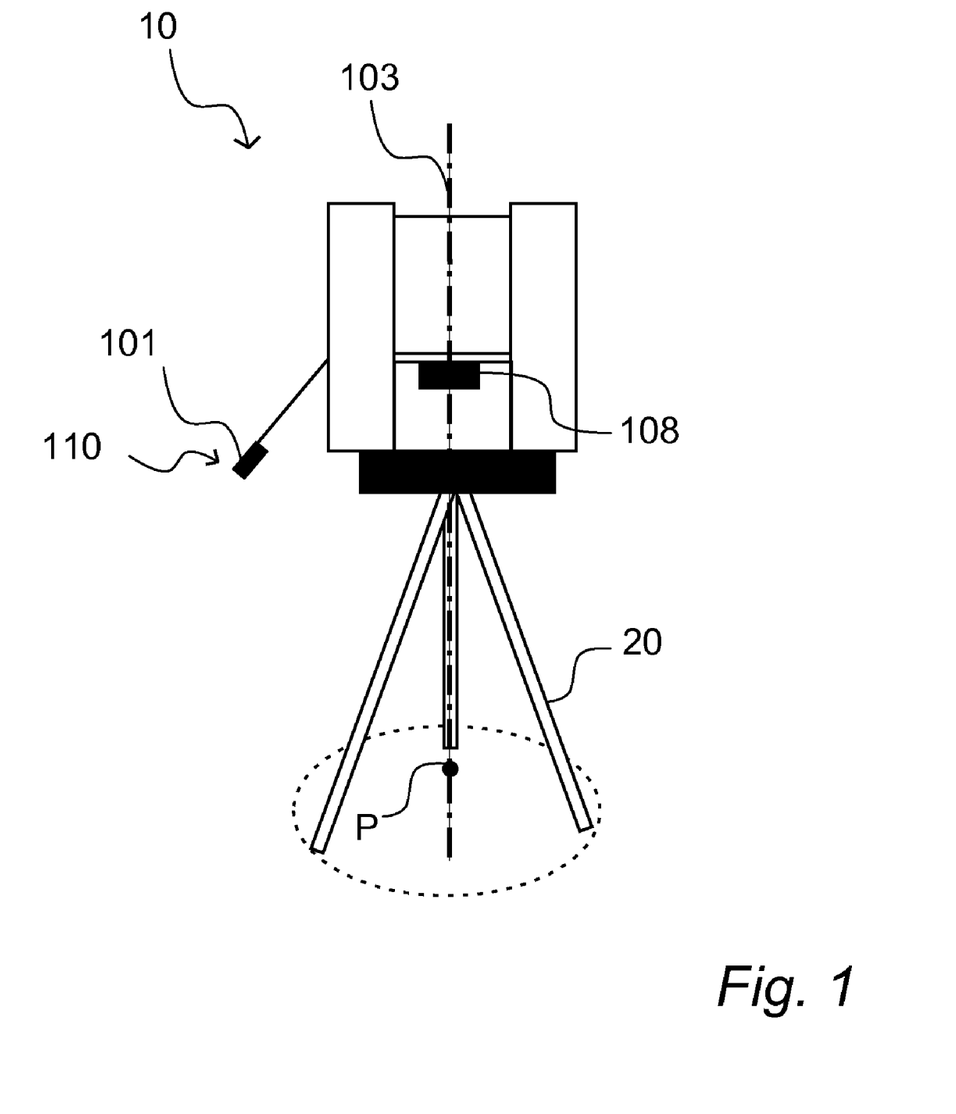
FIG. 1 is a view of a surveying instrument according to an embodiment of the present invention.

FIG. 1 illustrates schematically a total station 10 mounted on a tripod 20. The total station comprises at least one camera 110 positioned in a camera position 101 for capturing images of the ground below the instrument (or housing of the total station). According to the present invention, an object point relating to a mark located at the ground level, denoted by the letter P in the figures, is identified in images captured by the camera of the surveying instrument. The total station further comprises a pointing device 108, which for example may be an optical plummet or a laser plummet, for aligning the nadir 103 of the instrument with the mark P located at the ground level.

Figure 2:
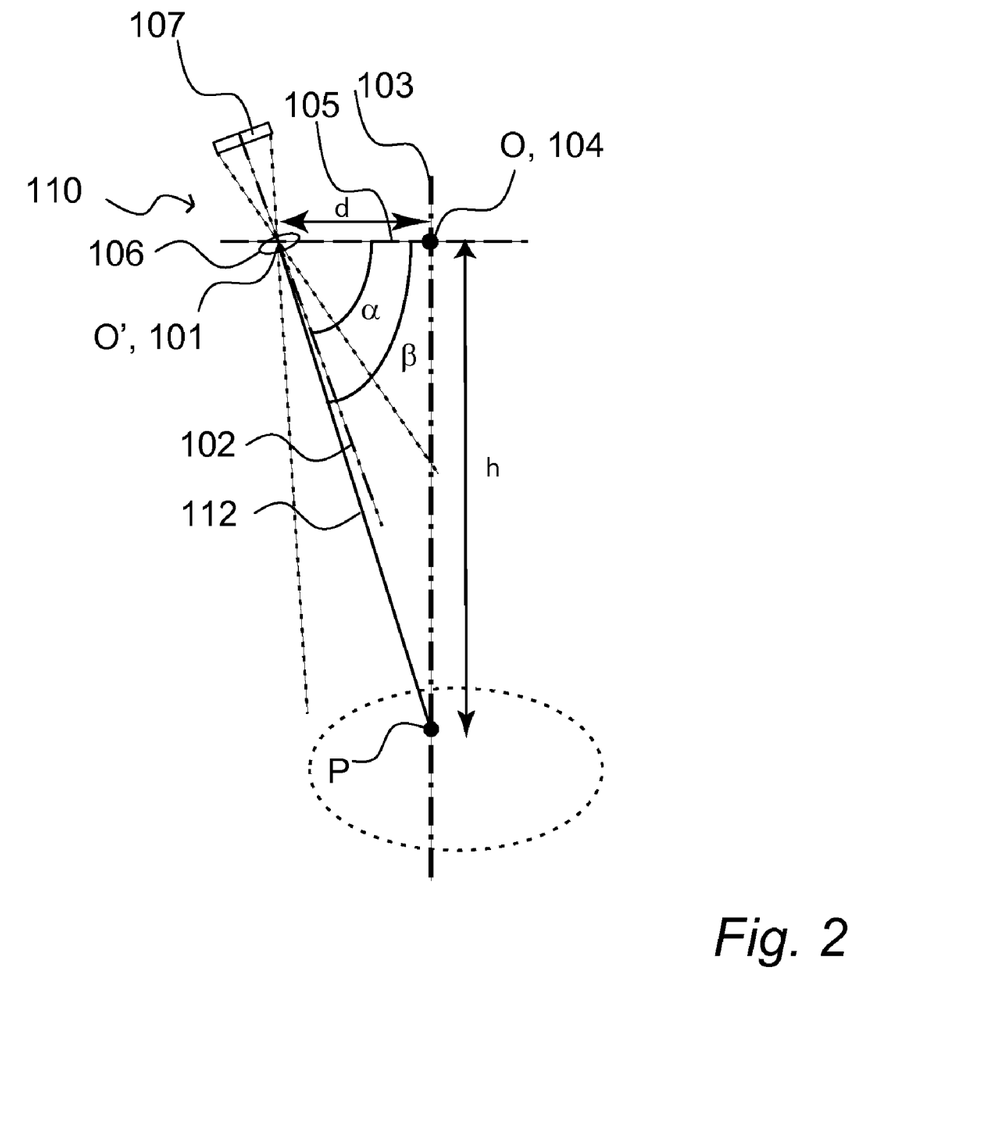
FIG. 2 schematically shows the parameters of the surveying instrument used in the method of the present invention.

With reference to both FIGS. 1 and 2, there is shown at least one camera sensor 107, such as a CMOS camera or a CCD, in the position 101 for capturing an image centered about a camera axis 102. The camera axis 102 is perpendicular to the camera sensor 107 or plane in which the image is formed on the sensor. The images are formed on the camera sensor 107 by means of an optical system such as a lens 106. The camera 110 in the position 101 has a camera center, or projection center, indicated by O'.

As illustrated in FIG. 2, the camera center O' and a rotational center 104 of the surveying instrument form an horizontal line denoted 105 having a length d. The position 101 of the camera center O' is eccentric with respect to the rotation center 104 of the instrument and the eccentricity of the position 101 is determined by the distance d to the rotational center.

It is noted that the rotation center O, as shown in FIG. 2, is located along the nadir of the instrument and represents the center of rotation for the camera. The rotation center O represented in FIG. 2 is not necessarily the center of the instrument as normally defined by the intersection between the vertical and horizontal axis of the telescope of the center unit of the surveying instrument (see feature 414 in FIG. 4). It is noted that the position of the center O 104 for rotation of the camera in relation to the position of the center 414 of the instrument may be known from calibration.

The camera sensor is also characterized by its orientation, i.e. the angle α formed between the camera axis 102 and the line 105, which corresponds to the angle at which the camera is oriented to view the area located between the legs of the tripod.

The camera optical axis should ideally be perpendicular to the plane of the camera sensor 107 and the optical system should be free from distortions or aberrations. However, this is not the case in practice and this may be taken into account by calibration of the camera.

It is noted that, for simplicity, FIGS. 1 and 2 show views of the surveying instrument in two dimensions only. However, a person skilled in the art would understand that the elements and features shown in FIGS. 1 and 2 may be defined in terms of other angles than those shown in the figures. For example, the orientation of the camera may also be defined by the angle formed by the image plane defined by the camera sensor around the arm on which the camera is arranged.

According to the present invention, the pointing device 108 is adapted to align the nadir of the instrument with the ground mark, thereby forming a right angle triangle. The right angle is formed between the line intersecting the center O of the instrument (for rotation of the camera) and the ground mark after the alignment with the pointing device and the line 105. Once the nadir is aligned with the ground mark, an image is captured by the camera sensor, with the camera center located in a camera position O' eccentric to the location O of the rotation center of the surveying instrument and having a specific camera orientation. A mark P located at the ground level is selected by identifying an object point in the captured image.

Once the mark has been selected by identification of the object point in the captured image, image coordinates of the object point in the captured image are measured.

Then, the height of the rotation center O of the surveying instrument above the ground, i.e. in relation to or above the ground mark, is determined based on the image coordinates and camera calibration data.

In particular, the image coordinates provide the angle β formed between the line 105 and the direction 112 from the camera to the ground mark (i.e. the line intersecting the center O' of the camera and the ground mark P). In particular, the camera 110 (i.e. the camera sensor with its optical system) is preferably calibrated such that every pixel of the camera sensor is related to an angle. Once the angle β has been determined, the height h of the instrument above the ground may be calculated using trigonometry. The height h may be calculated using the following equation:

$$h = d \times \tan(\beta) \tag{1}$$

Figure 3:
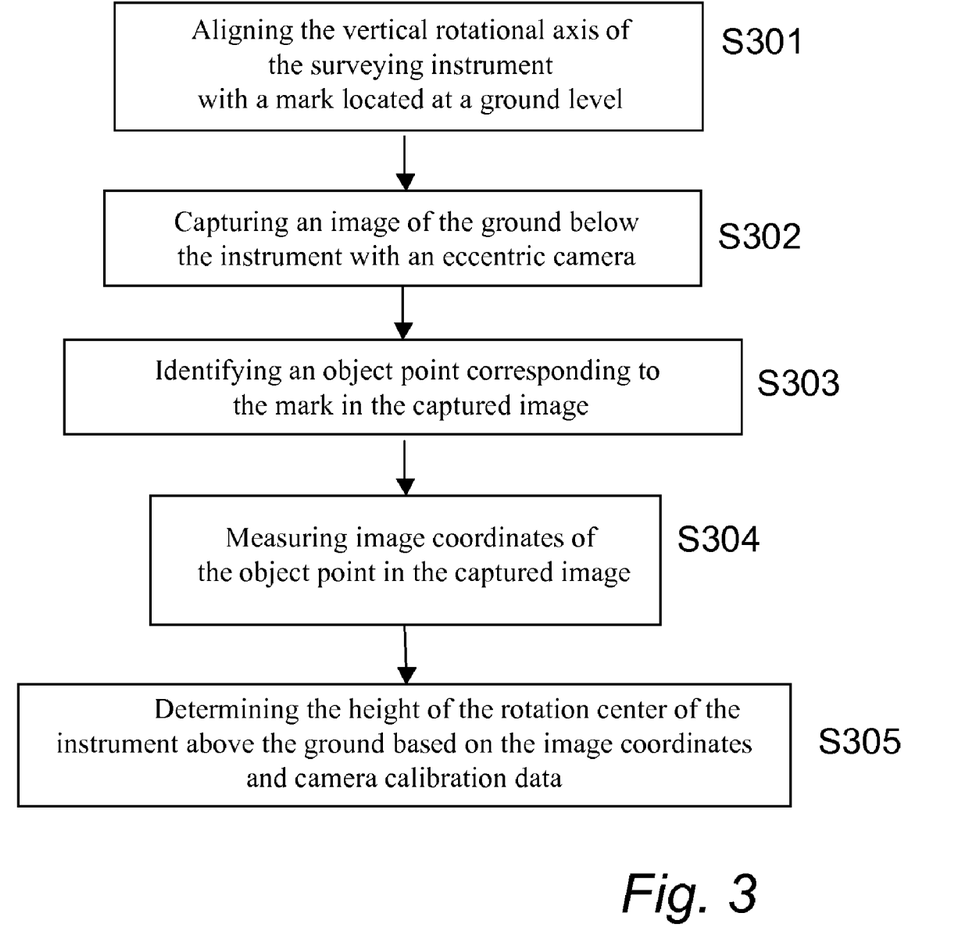
FIG. 3 is a general outline of the inventive method.

General steps of the method according to the present invention are outlined in FIG. 3. The method is performed in a surveying instrument comprising at least one camera and a pointing device 108 and starts with aligning, in a step S301, the nadir of the instrument with a mark located at the ground level using a pointing device. In step S302, an image of the ground below the instrument is captured by the camera arranged in a known camera position and orientation, the camera position being eccentric to the rotation center of the surveying instrument. In step S303, an object point corresponding to a ground mark is identified in the captured image, which may be a snapshot or a frame of a video feed captured by the camera. For example, the mark may be identified by selection by a surveyor clicking on a screen showing the image captured by the camera, or in any other suitable way of indicating the mark with respect to the captured image. It is also envisaged that the identification of the mark can be made in other ways, such as edge detection or identification of mark features. For example, the mark may comprise features such as arrows for facilitating identification of the mark in the captured images. In order to facilitate the selection of the object point, it is preferred that it is indicated in the screen image the point corresponding to the instrument nadir, for example using a cross-hair, a dot or similar. Once the mark has been selected by identification of the object point in the captured image in the step S303, image coordinates of the object point in the captured image are measured in a step S304. Finally, the height of the rotation center of the total station in relation to the mark located at the ground level is determined in a step S305 based on the image coordinates and camera calibration data.

According to an embodiment, the object point corresponding to the mark is identified by capturing a first image while the mark is illuminated by means of a light source, capturing a second image with the light source turned off, and subtracting the first and second image from one another in order to produce a difference image on which an object point representative of the mark is identified. The object point may be a projected spot or pattern on the mark. The light source may be an external light source arranged at the housing of the instrument or may be the laser pointer used as pointing device.

According to an embodiment, a structured object may be arranged on the mark for facilitating identification of the object point in the captured images. The structured object may be an object comprising, for instance, an easily identifiable pattern such as concentric circles. The structured object may alternatively be a coin which also can provide an image with increased contrast in the area of the captured image corresponding to the mark. As the structured object is placed on top of the mark, the thickness of the structured object is taken into account when determining the height of the instrument over the ground (in relation to the mark).

Alternatively, the method may comprise, for e.g. improving the accuracy in determining the height, a step of capturing a second image using the camera in a second camera position and orientation, after which step the object point identified in the first captured image is identified in the second captured image. In this case, the object point may be identified by selection by an operator clicking on a screen showing the image captured by the camera, or preferably by means of digital image processing. Once the object point has been identified in the second captured image, second image coordinates of the object point in the second image are measured and the height of the instrument may be determined based on the second image coordinates and camera calibration data corresponding to the second camera position and orientation. Capturing of a plurality of images in different positions may be implemented by means of a single camera and rotation of the instrument to different positions or by means of more than one camera arranged at different positions.

According to the present invention, the two-dimensional coordinates, in a horizontal plane, of the total station are equal to the two-dimensional coordinates of the mark located at the ground level since the nadir of the instrument is aligned with the ground mark.

After determination of the height of the instrument in relation to the mark in accordance with the method of the present invention, the three-dimensional coordinates of the rotation center in relation to the mark can then be used in subsequent geodetic measurements performed by the instrument to relate instrument measurements to the coordinates of the ground mark.

According to an embodiment, the point device is an optical plummet calibrated in relation to the vertical rotational axis of the instrument. The optical plummet includes an eye piece for providing a view with a center mark that allows centering of the total station over the mark located at the ground level by mechanically moving the total station, thereby aligning the vertical rotational axis of the instrument with the mark.

According to another embodiment, the pointing device is a laser plummet including a laser pointer calibrated in relation to the vertical rotational axis of the instrument. The laser plummet provides a point or pattern on the ground that allows centering of the total station over the mark located at the ground level by mechanically moving the total station, thereby aligning the vertical rotation axis of the instrument with the mark.

To further localize the surveying instrument, a step of orienting the horizontal pointing direction of the surveying instrument may be carried out by aiming at a reference point located at a remote position from the surveying instrument. The reference point used for orienting the pointing direction is positioned at a known location in the coordinate system. The orientation of the surveying instrument to a known control point together with the determination of the relative three-dimensional coordinates (and in particular the height) of the surveying instrument in relation to the ground mark result in a complete localization of the surveying instrument in the coordinate system.

Orientation of the direction from the surveying instrument towards a reference point may be implemented using a telescope of the surveying instrument or a camera mounted on the housing of the instrument such that the field of view of the camera comprises the reference point. The camera used for orienting the total station may either be the same camera as that used to determine the height of the instrument (if this camera can be oriented such that its field of view covers the reference point) or another camera. The direction to the reference point from the camera may be expressed as horizontal and vertical angles $(\theta^x, \theta^y)$ from the camera axis. For this purpose, a function is provided in the instrument (or in an associated control unit) that determines the direction to a reference point or target from the camera by calculating the horizontal and the vertical angles $(\theta^x, \theta^y)$ based on pixel coordinates in the image or video feed captured by the camera. Hence, the function f that calculates the horizontal and vertical angles $(\theta^x, \theta^y)$ based on image pixels can be described as $$(\theta^x, \theta^y) = f(x, y, C)$$

where x, y are the number of pixels (or more generally, pixel coordinates) of the desired reference point or target in the coordinate system of the camera, and C are calibration factors to be determined for each system. The calibration factors C include details about the camera, such as but not limited to, its eccentricity to the rotation center of the total station and its focal length. For a general description of how to calculate horizontal and vertical angles based on an image captured by a camera in the instrument, reference is made to the above-mentioned WO 2005/059473.

The distance between the rotation center of the instrument and the camera position and the angle between the line 105 and the camera axis of the camera are preferably calibrated after assembly of the total station at the production stage. It is envisaged to arrange the camera on an arm which may be deployed (or fold out) from the instrument or instrument housing to form a well defined angle with the line 105 or housing, such as shown in FIGS. 1 and 2. It is also envisaged that, alternatively, a number of well defined angles are selectable by a surveyor such that the area covered by the field of view of the camera can be adjusted. Alternatively, a surveyor may slide out, from the housing of the instrument, in a horizontal plane, the arm on which the camera is arranged.

The camera may also be adjustable in position at well defined distances to the rotation center of the instrument by means of e.g. a telescopic arm.

The instrument would then register the angle and distance corresponding to the camera position and orientation used when capturing the images and take these calibration data into account for determining the height of the total station in relation to the ground mark.

Further, other calibration data can be considered, for example camera position independent parameters such as the so-called camera constant representing distance between the camera center and image plane and/or parameter of distortion, which depends on the image position.

Figure 4:
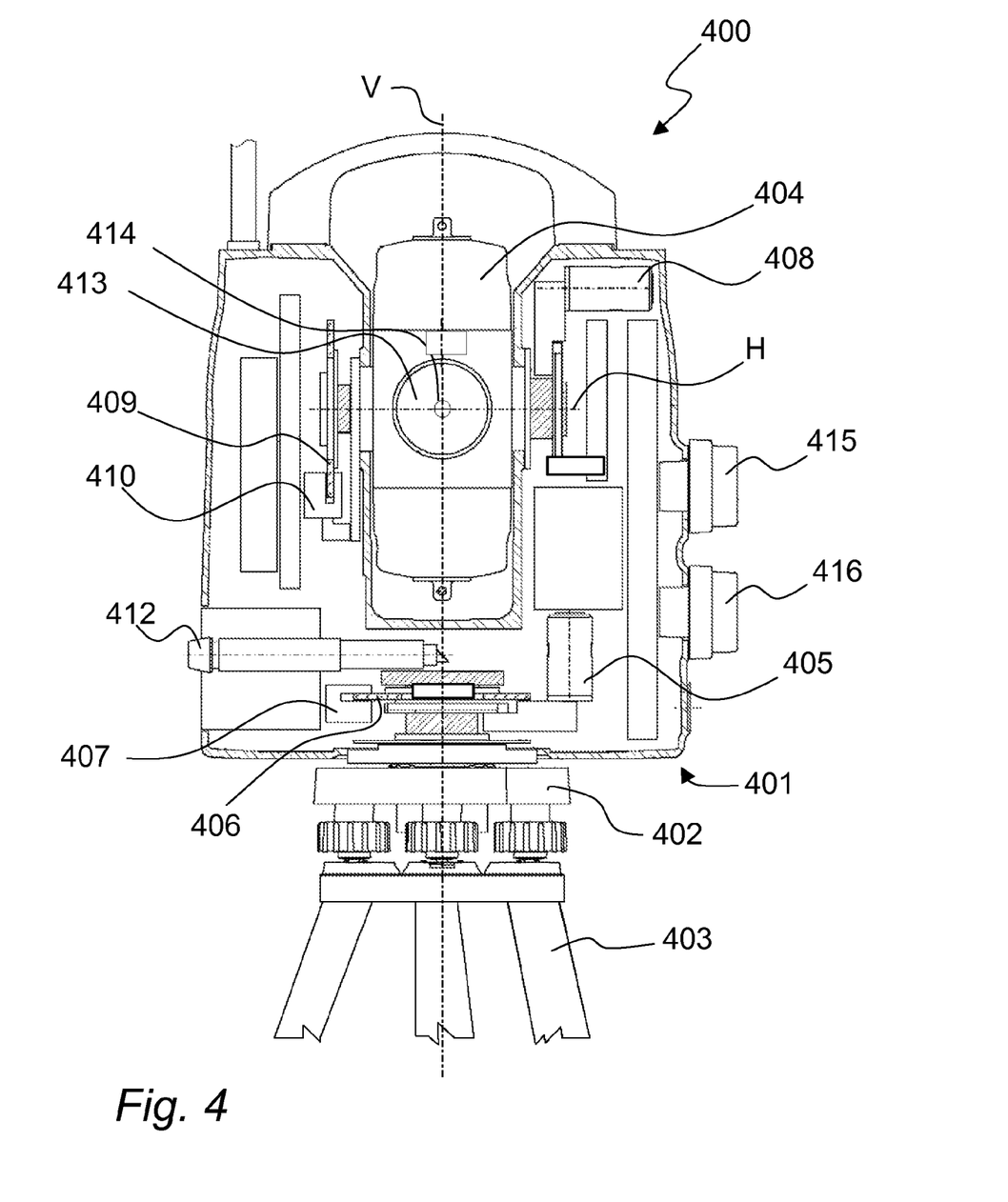
FIG. 4 shows schematically a geodetic instrument according to the present invention.

In FIG. 4, there is shown one example of a total station according to the present invention. In many aspects, the total station comprises features known from previous instruments. For example, the total station 400 shown in FIG. 4 comprises an alidade 401 mounted on a base 402, and has a mounting support structure in the form of a tripod 403. The alidade 401 can be rotated about a vertically oriented rotation axis V, in order to aim the instrument in any desired horizontal direction. In the alidade, there is arranged a center unit 404, which can be rotated about a horizontally oriented rotation axis H, in order to aim the instrument in any desired vertical direction. Measurements made using the total station 400 are typically related to an origin of coordinates located at the intersection between the vertically oriented and the horizontally oriented rotation axes V and H.

For rotation of the alidade about the vertically oriented rotation axis to aim the instrument in any desired horizontal direction, there is provided drive means 405. The rotational position of the alidade 401 is tracked by means of a graduated disc 406 and a corresponding angle encoder or sensor 407. For rotation of the center unit 404 about the horizontally oriented rotation axis, there are provided similar drive means 408, graduated disc 409 and sensor 410.

As mentioned above, the instrument line of sight is centered at the intersection between the vertical and the horizontal rotation axes, and this can be seen in the figure where these axes cross in the center of a telescope 413 in the center unit 404.

The instrument can also be manually operated for aiming towards a desired target located at a remote position from the instrument using vertical and horizontal motion servo knobs 415 and 416.

According to the present invention, the instrument further comprises a pointing device 412, which gives a downwards view along the vertically oriented rotation axis. As mentioned above, the pointing device may be an optical plummet or a laser plummet and is used by the operator to center or position the instrument above any desired point on the ground. The instrument further comprises at least one camera adapted to capture an image of the ground below the instrument. The camera is arranged in a known camera orientation and position with the camera position being eccentric to a rotation center of the surveying instrument. The instrument further comprises identifying means or an identifying unit adapted to identify an object point corresponding to the mark in the captured image, measuring means or a measuring unit adapted to measure image coordinates of the object point in the captured image, and processing means or a processor adapted to determine the height of the rotation center of the surveying instrument above the ground based on the image coordinates and camera calibration data.

The instrument may optionally comprise a display device for showing the image captured by the camera. The display device may be an integral part of the instrument, but more preferably, the display device is included in a removable control panel that can be used for remote control of the instrument via short range radio. It is even conceivable that the instrument is fully remote controlled, wherein the display device may be in the form of a computer screen located far away from the total station, and wherein information to and from the instrument are transferred over a wireless computer or radio telephone network.

The means for identifying the object point in the captured image may take the form of a cursor that can be moved across the display. Alternatively, the display may be a touch display, where the object point is identified by simply clicking or tapping on the display. This is preferred for the identification of the object point in the first image.

The means for identifying the object point may include further functionality implemented in the form of image processing software. In such case, the further functionality would be that object points may be identified based on certain features in the captured image, for example markers or patterns located at the desired ground mark. For example, an object point identified in a first image may be automatically identified in a second image based on patterns identified in the first image. In case the object point is automatically identified by the instrument, the user may be given the option to give a confirmation that the identified object point is correct before or during the aiming and measuring procedures. This is preferred for the identification of the object point in a second image.

The means for measuring image coordinates of the object point in the displayed images, and the means for determining coordinates of the ground mark in relation to the rotation center of the surveying instrument are preferably implemented in the form of computer program code that is executed in a processor. However, implementation may also be made in dedicated hardware, such as in a special purpose microprocessor or a digital signal processor (DSP), firmware or similar.

While specific embodiments have been described, the skilled person will understand that various modifications and alterations are conceivable within the scope as defined in the appended claims.

The invention claimed is:

1. A method for localizing, in relation to a mark located at a ground level, a surveying instrument having a housing including at least one camera, said method comprising:
   aligning a vertical rotational axis of the surveying instrument with said mark using a pointing device;
   capturing an image of the ground below the housing with said at least one camera arranged in a camera position and orientation, said camera position being eccentric to a rotation center of the surveying instrument;
   identifying an object point corresponding to the mark in the captured image;
   measuring image coordinates of the identified object point in the captured image; and
   determining a height of the rotation center of said instrument above the ground based on the measured image coordinates and camera calibration data.

2. The method of claim 1, wherein said pointing device is an optical plummet calibrated in relation to the vertical rotational axis of said surveying instrument, said optical plummet including an eye piece for providing a view with a center mark that allows centering of a total station over the mark located at the ground level by mechanically moving the total station, thereby aligning the vertical rotational axis of said surveying instrument with said mark.

3. The method of claim 1, wherein said pointing device is a laser plummet including a laser pointer calibrated in relation to the vertical rotational axis of said surveying instrument, said laser plummet providing a point or pattern on the ground, said point or pattern allowing centering of a total station over the mark located at the ground level by mechanically moving the total station, thereby aligning the vertical rotation axis of said surveying instrument with said mark.

4. The method of claim 1, further comprising:
   determining relative three-dimensional coordinates of the rotation center of said surveying instrument in relation to said mark based on the image coordinates and camera calibration data.

5. The method of claim 1, wherein the mark located at the ground level is positioned at a known location in a coordinate system.

6. The method of claim 1, wherein the calibration data comprises the orientation and position of the camera in relation to the rotation center of said surveying instrument.

7. The method of claim 1, wherein the object point is identified in the images by way of operator selection or automatic image analysis.

8. The method of claim 1, wherein identifying the object point corresponding to said mark comprises:
   capturing a first image while the mark is illuminated by way of a light source,
   capturing a second image with the light source turned off, and
   subtracting the first and second image from one another in order to produce a difference image on which the object point representative of said mark is identified.

9. The method of claim 8, further comprising:
   arranging a structured object on said mark for facilitating identifying of the object point in the captured images.

10. A non-transitory computer readable medium comprising computer program code portions adapted to perform the method of claim 1 when loaded and executed in a computer.

11. A surveying instrument, comprising:
   a pointing device adapted to align a vertical rotational axis of the surveying instrument with a mark located at a ground level;
   at least one camera adapted to capture an image of the ground below the surveying instrument, said at least one camera being arranged in a camera orientation and position, said camera position being eccentric to a rotation center of the surveying instrument;
   an identifying unit adapted to identify an object point corresponding to said mark in the captured image;
   a measuring unit adapted to measure image coordinates of the identified object point in the captured image; and
   a processor adapted to determine a height of the rotation center of the surveying instrument above the ground based on the measured image coordinates and camera calibration data.

12. The surveying instrument of claim 11, wherein said pointing device is an optical plummet calibrated in relation to the vertical rotational axis of said surveying instrument, said optical plummet including an eye piece for providing a view with a center mark that allows centering of a total station over the mark located at the ground level by mechanically moving the total station, thereby aligning the vertical rotational axis of said surveying instrument with said mark.

13. The surveying instrument of claim 11, wherein said pointing device is a laser plummet including a laser pointer calibrated in relation to the vertical rotational axis of said surveying instrument, said laser plummet providing a point or pattern on the ground, said point or pattern allowing centering of a total station over the mark located at the ground level by mechanically moving the total station, thereby aligning the vertical rotation axis of said surveying instrument with said mark.

14. The surveying instrument of claim 11, wherein the mark located at the ground level is positioned at a known location in a coordinate system.

15. The instrument of claim 11, wherein the identifying unit is implemented as a cursor movable across the displayed images, using image processing software or using a touch display where the object point is identifiable by clicking or tapping on the display.

16. The method of claim 2, further comprising:
   determining relative three-dimensional coordinates of the rotation center of said surveying instrument in relation to said mark based on the image coordinates and camera calibration data.

17. The method of claim 3, further comprising:
   determining relative three-dimensional coordinates of the rotation center of said surveying instrument in relation to said mark based on the image coordinates and camera calibration data.

18. The surveying instrument of claim 12, wherein the mark located at the ground level is positioned at a known location in a coordinate system.

19. The surveying instrument of claim 13, wherein the mark located at the ground level is positioned at a known location in a coordinate system.

20. A non-transitory computer readable medium including program segments for, when executed on a computer device, causing the computer device to implement the method of claim 1.

* * * * *